W. P. DUN LANY.
SAMPLE AFFIXING MACHINE.
APPLICATION FILED JAN. 7, 1916.
1,327,664.
Patented Jan. 13, 1920.
14 SHEETS—SHEET 1.
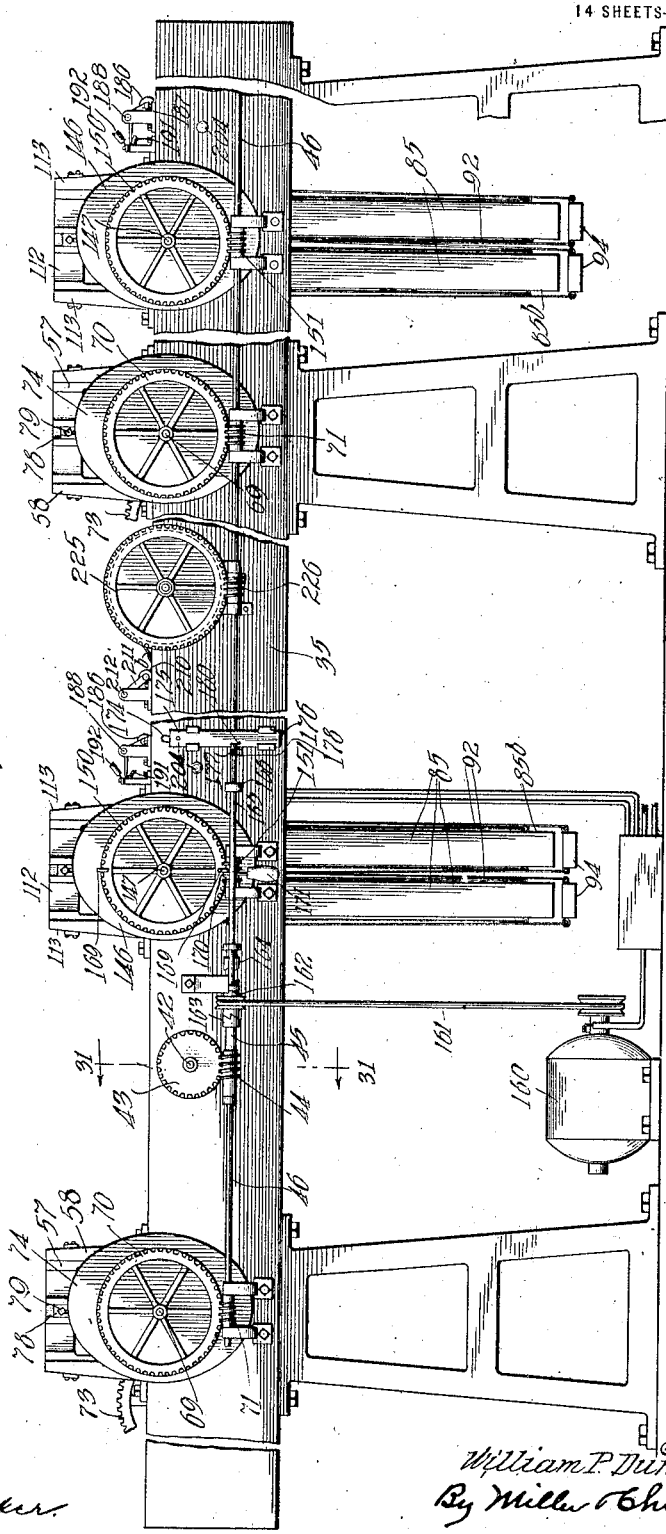

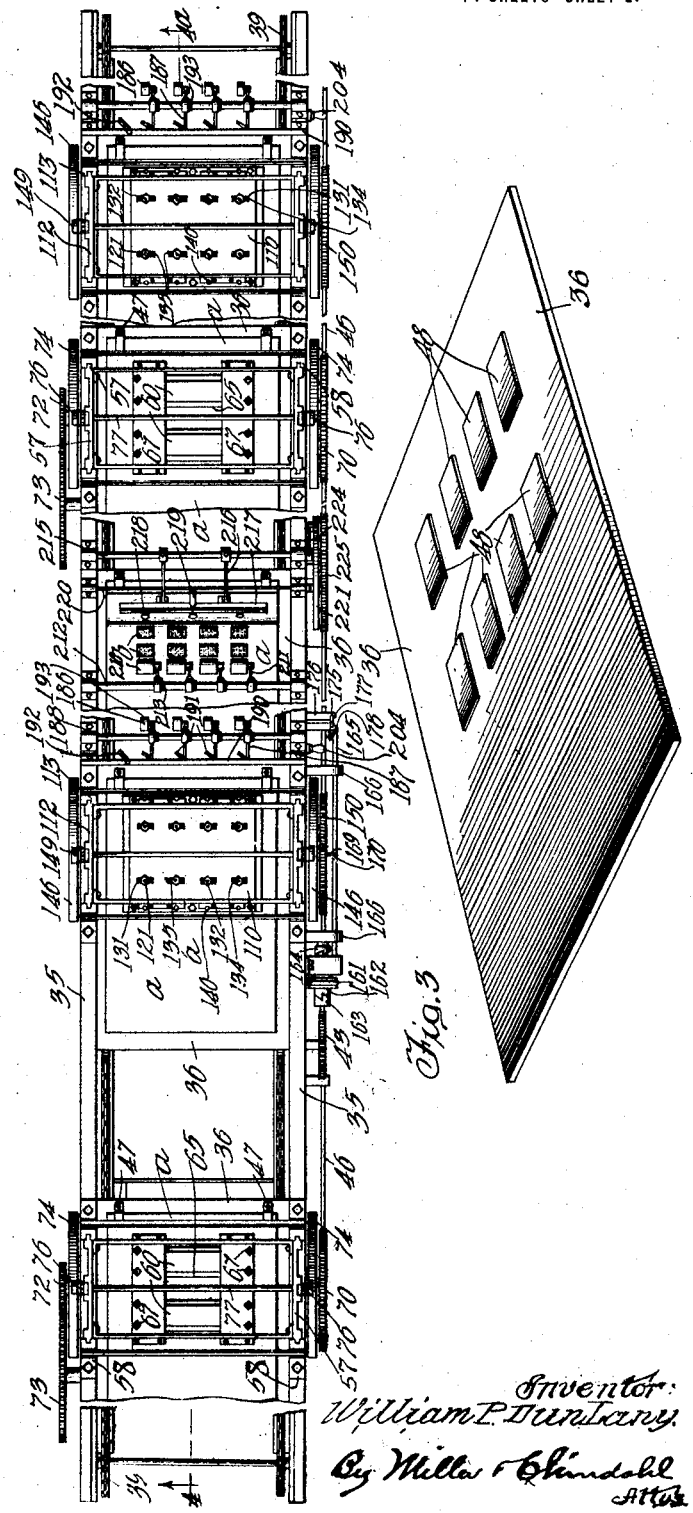

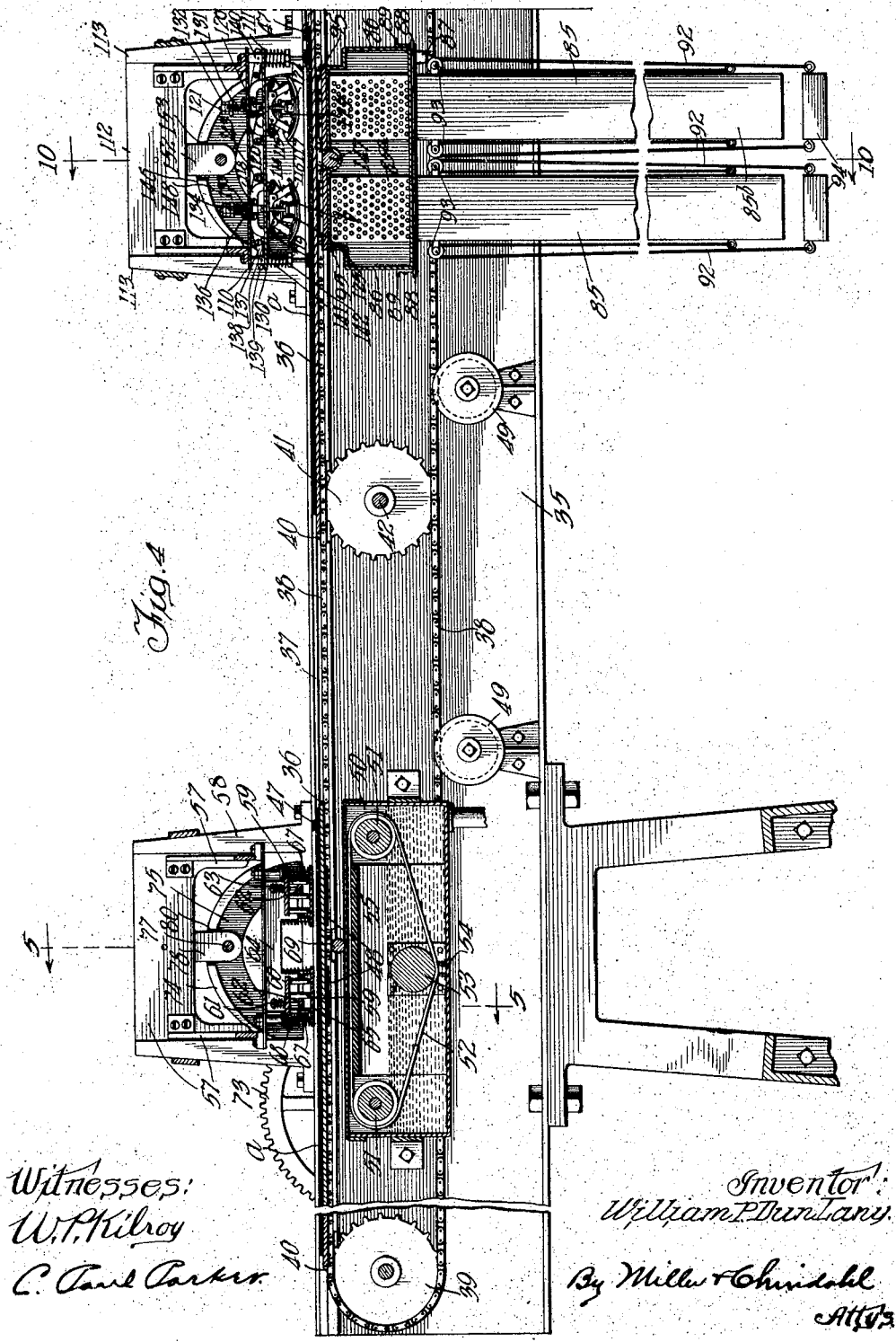

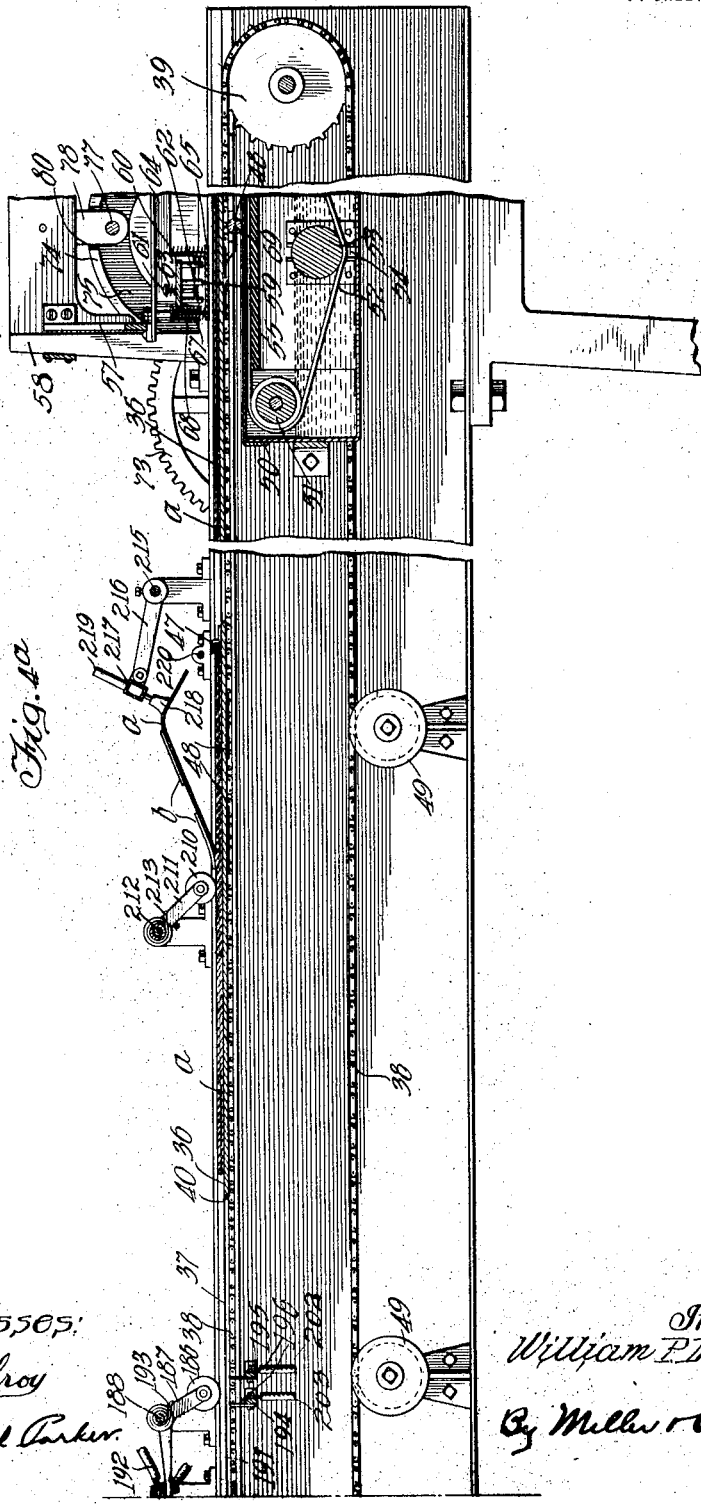

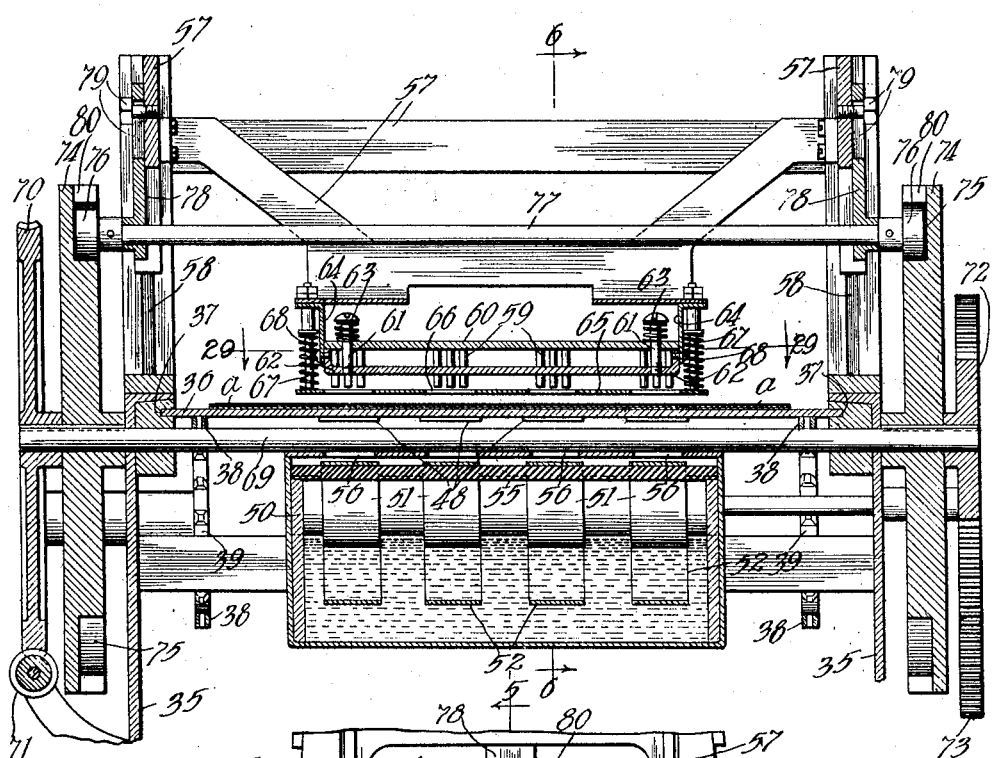

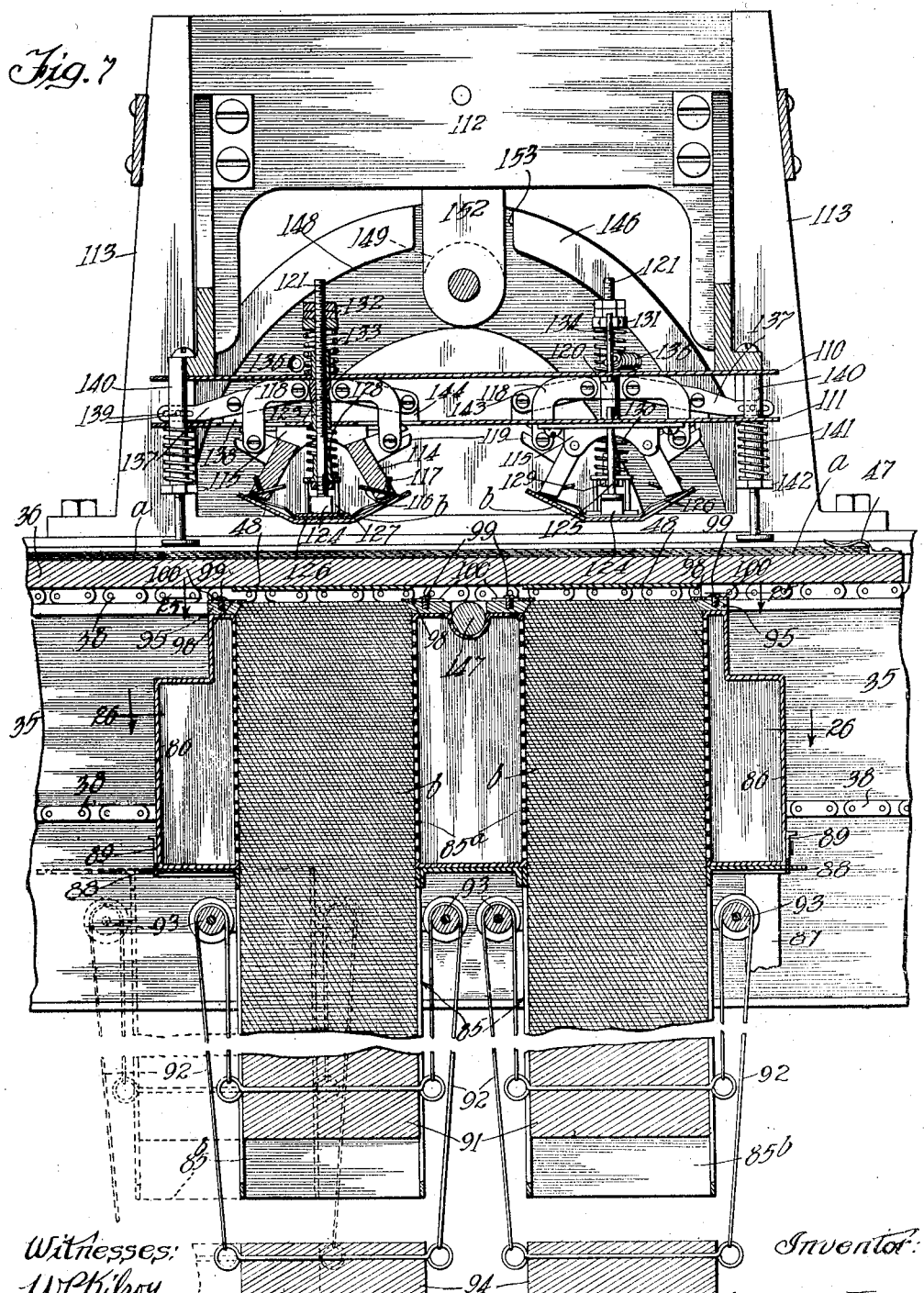

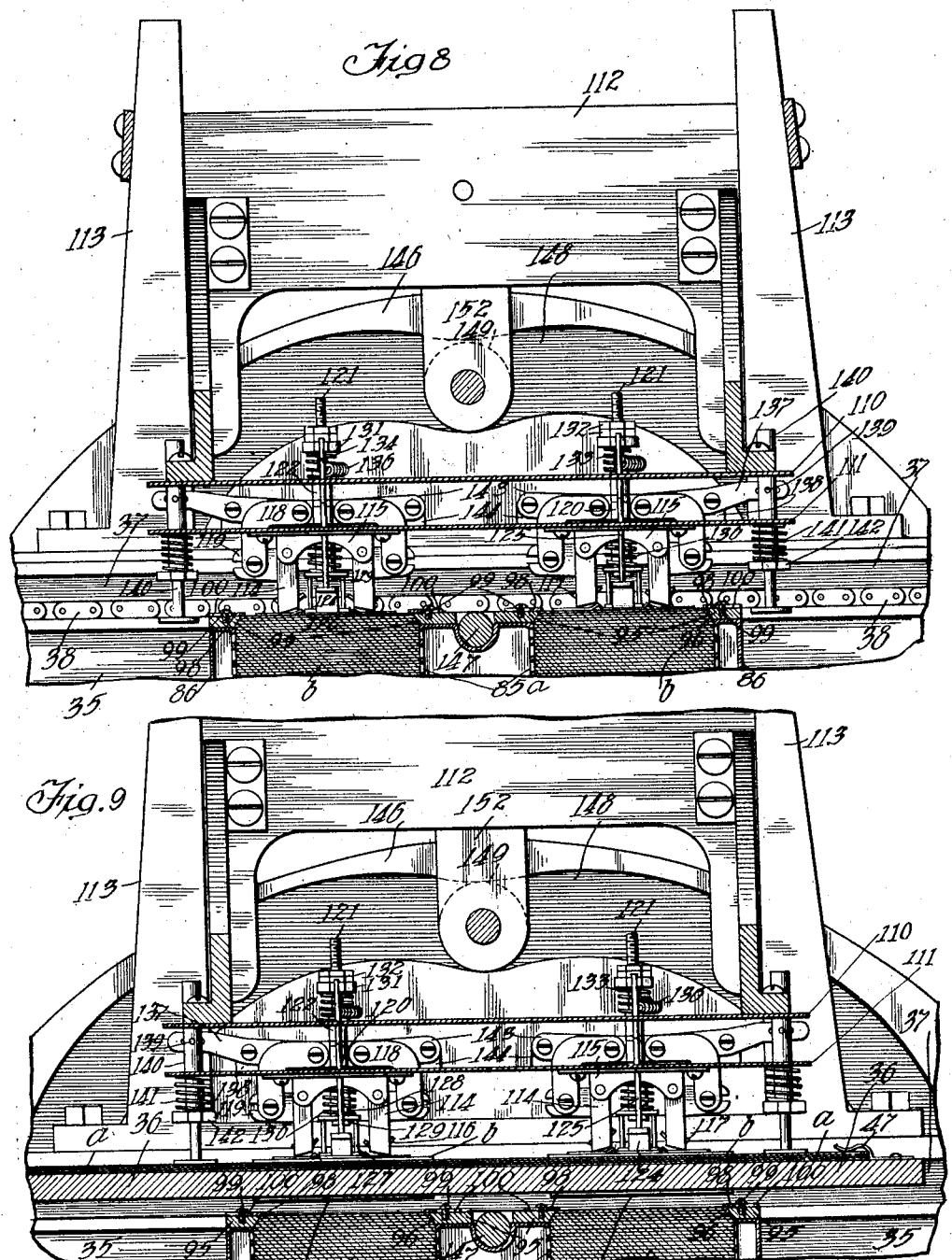

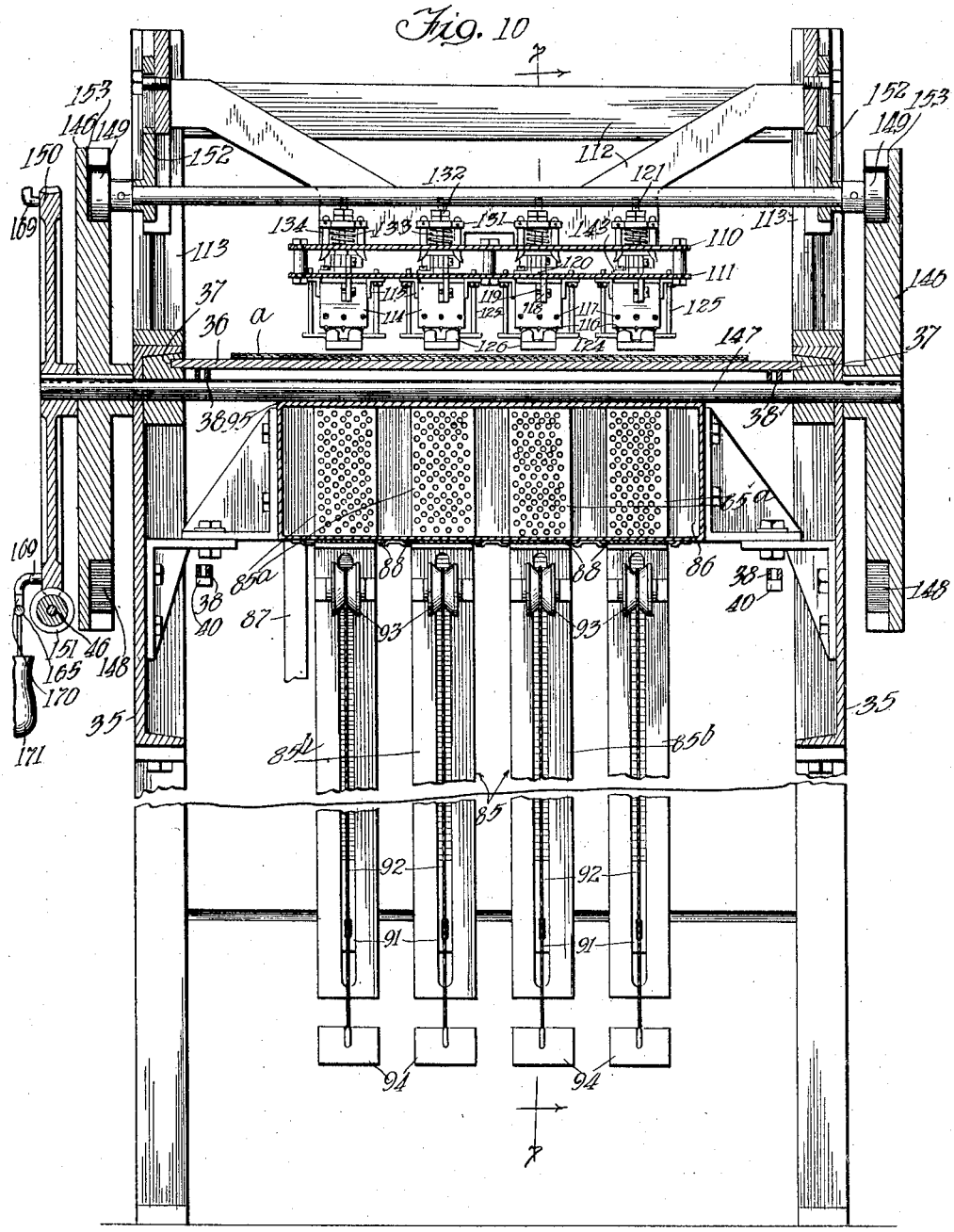

W. P. DUN LANY.
SAMPLE AFFIXING MACHINE.
APPLICATION FILED JAN. 7, 1916.
1,327,664.
Patented Jan. 13, 1920.
14 SHEETS—SHEET 9.
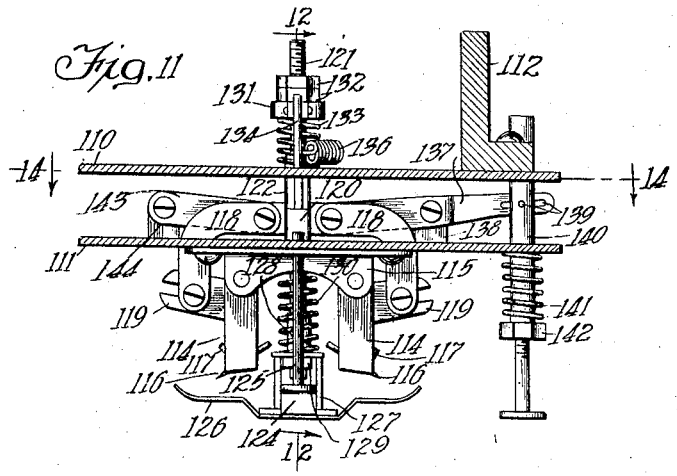
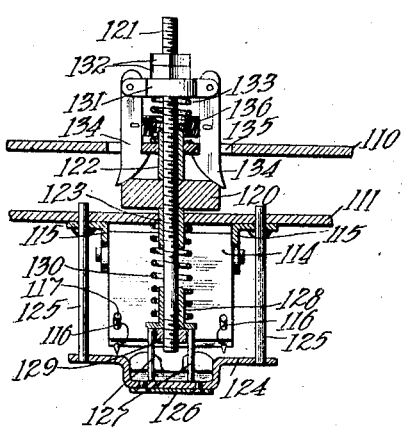
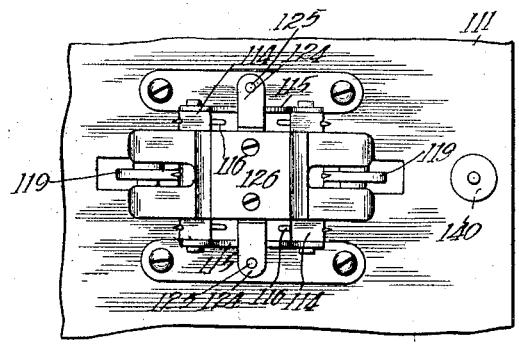
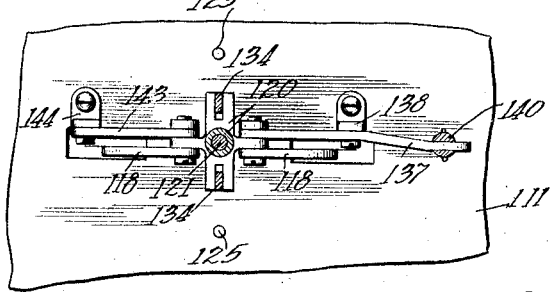
Witnesses:
W. P. Kilroy
C. Paul Parker
Inventor:
William P. Dun Lany.
By Miller Chindahl
Attys.

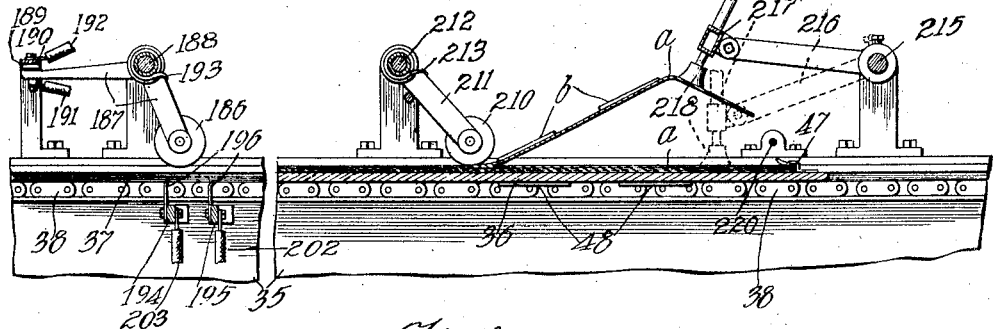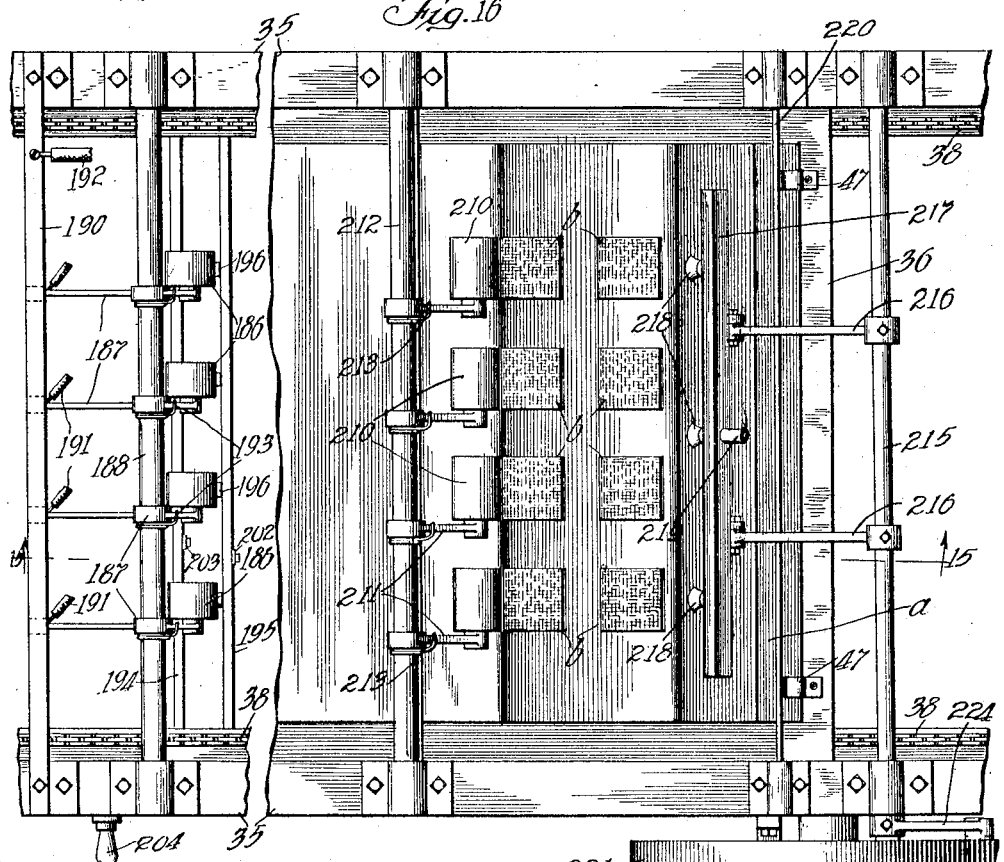

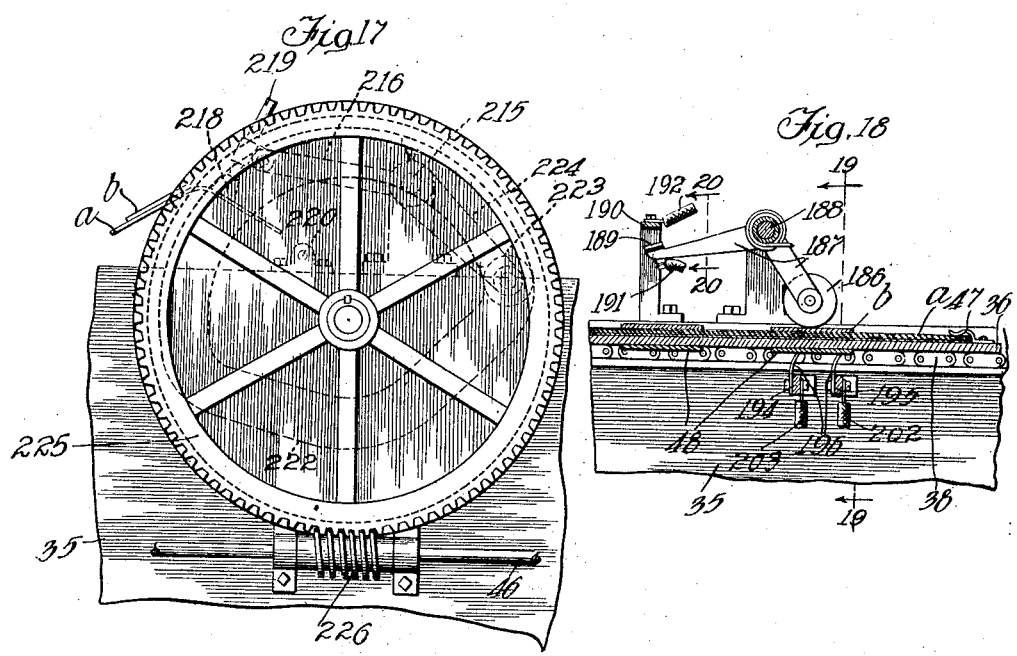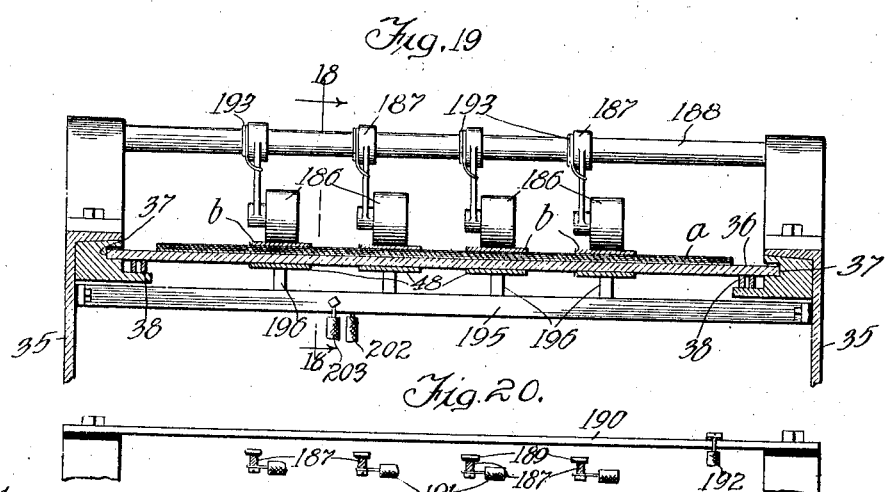

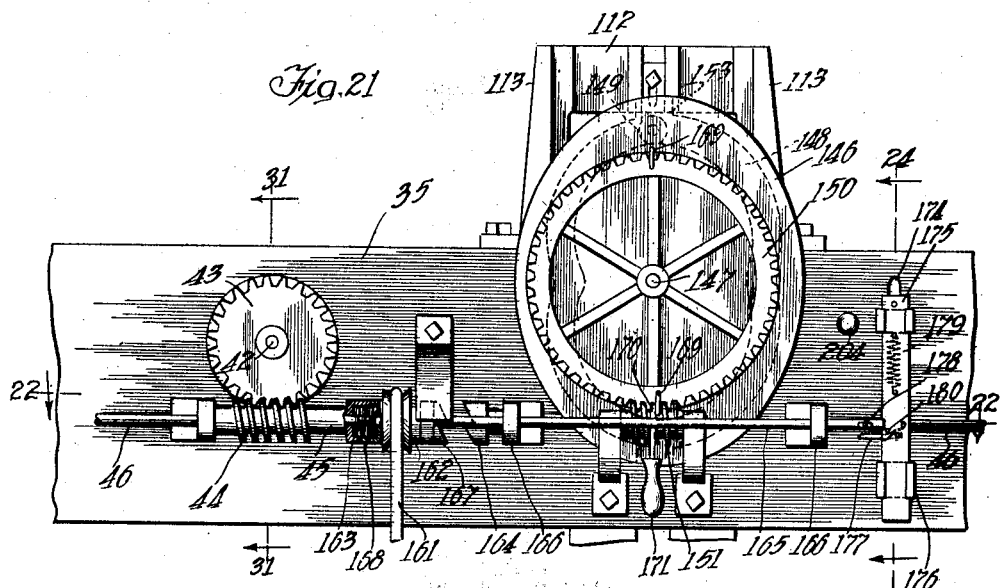
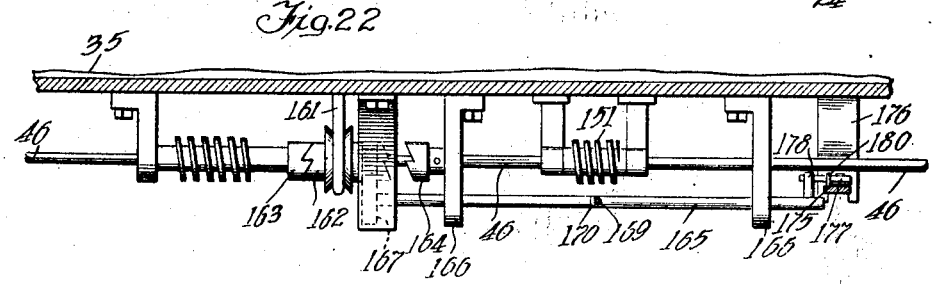
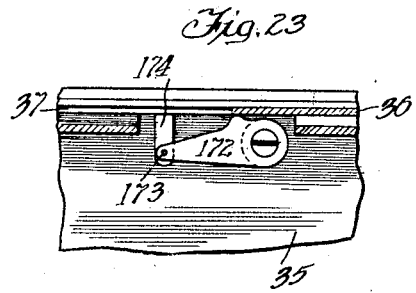
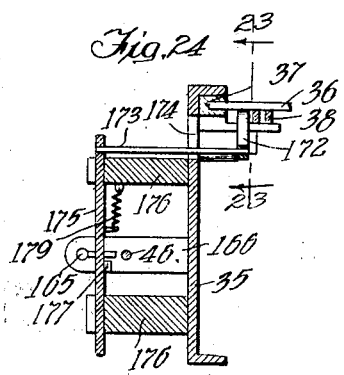

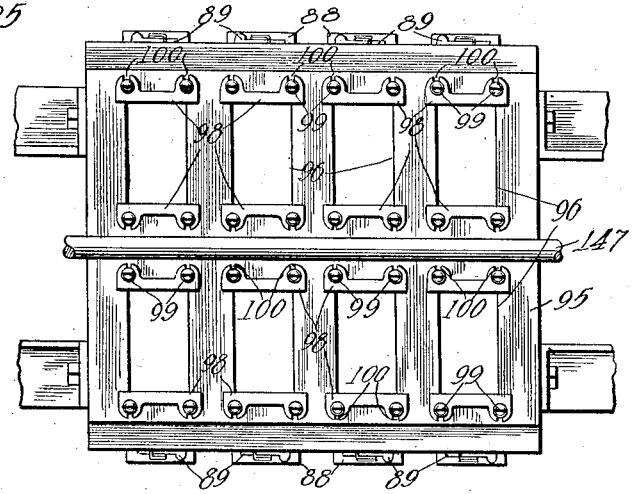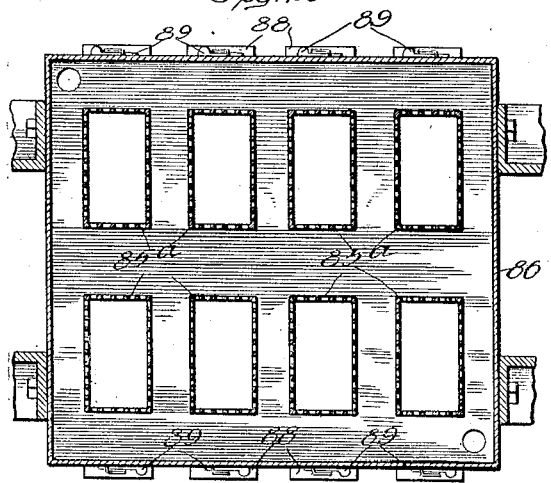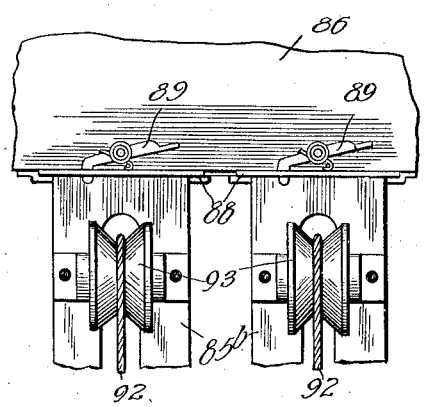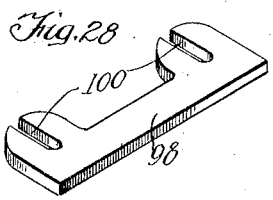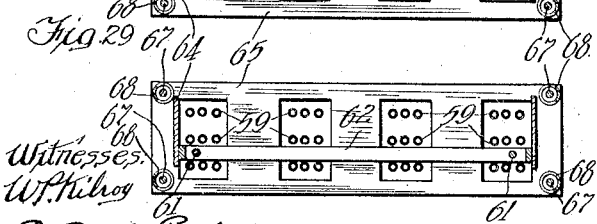

W. P. DUN LANY.
SAMPLE AFFIXING MACHINE.
APPLICATION FILED JAN. 7, 1916.
1,327,664.
Patented Jan. 13, 1920.
14 SHEETS—SHEET 14.
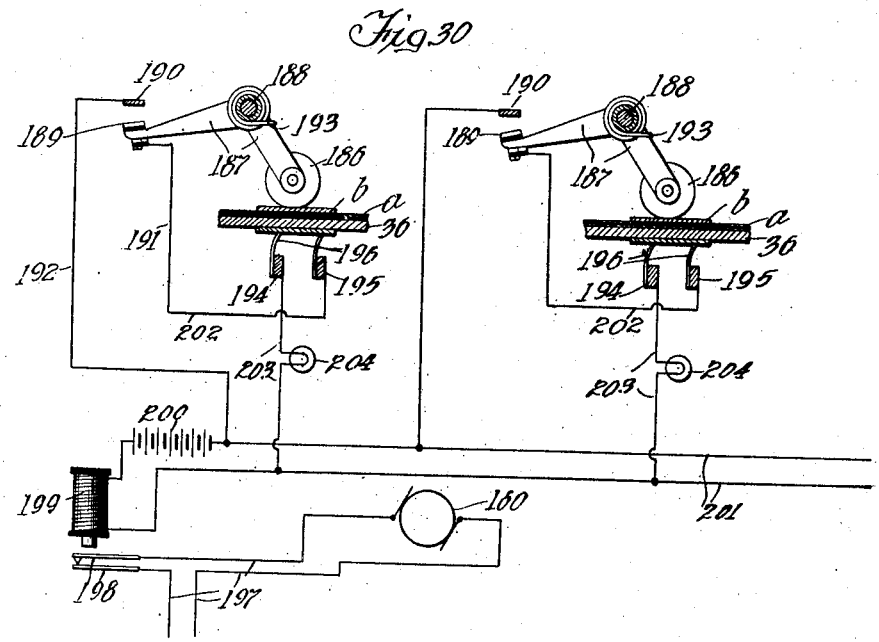
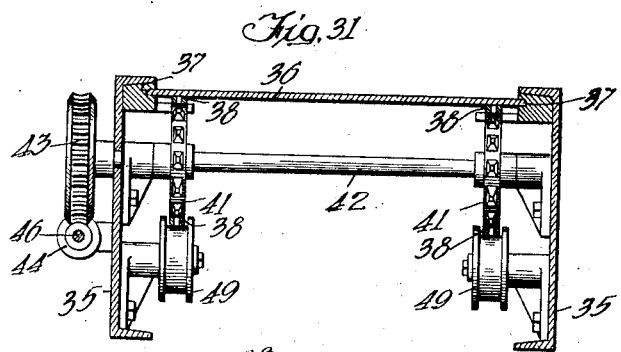
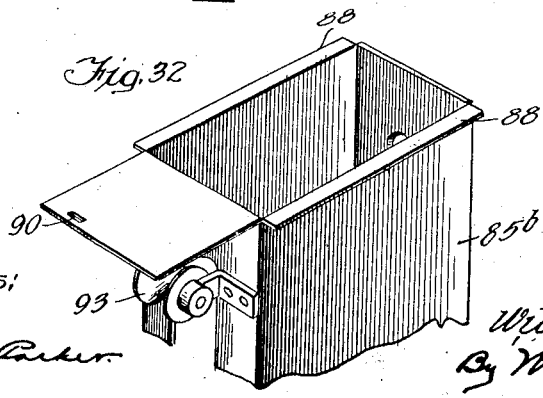

UNITED STATES PATENT OFFICE.

WILLIAM P. DUN LANY, OF CHICAGO, ILLINOIS, ASSIGNOR TO SEARS, ROEBUCK AND COMPANY, OF CHICAGO, ILLINOIS, A CORPORATION OF NEW YORK.

SAMPLE-AFFIXING MACHINE.

1,327,664.   Specification of Letters Patent.   Patented Jan. 13, 1920.

Application filed January 7, 1916.   Serial No. 70,719.

*To all whom it may concern:*

Be it known that I, WILLIAM P. DUN LANY, a citizen of the United States, residing at Chicago, in the county of Cook and State of Illinois, have invented certain new and useful Improvements in Sample-Affixing Machines, of which the following is a specification.

In making sample-books or catalogues, such as are used by clothing manufacturers and dealers for displaying samples of cloth, the samples have in the past usually been affixed to the sheets or pages by hand.

The general object of this invention is to produce an improved machine or mechanism for automatically affixing samples to a sheet.

With this general aim in view, the invention has for its objects to produce means for applying an adhesive substance to a sheet; to provide magazines for holding the different samples; and to produce means for taking successive samples from the magazines and applying the samples to the adhesive-treated sheet.

Another object is to provide means for detecting the failure of the sample-handling means and for stopping the machine and signaling the operator.

Another object of the invention is to produce a machine arranged to operate on a bound book comprising several pages and to automatically turn the pages and affix samples to the successive sheets of the book.

Further objects and advantages of the invention will be understood from the following detailed description.

In the accompanying drawings, Figure 1 is a side elevation with parts broken out illustrating a machine embodying the features of my invention.

Fig. 2 is a plan view of the machine with parts broken out.

Fig. 3 is a perspective view showing the lower side of one of the plates on which the catalogues are supported in their travel through the machine.

Figs. 4 annd 4ª, taken together, represent a longitudinal section through the machine in the plane of line 4—4ª of Fig. 2, parts being broken out.

Fig. 5 is a transverse section through the machine taken in the plane of line 5—5 of Figs. 4 and 6 and illustrating the adhesive-applying means.

Fig. 6 is a fragmental longitudinal section through said adhesive-applying means in the plane of line 6—6 of Fig. 5.

Fig. 7 is a longitudinal section on the line 7—7 of Fig. 10, illustrating the sample magazines and the sample-applying means.

Figs. 8 and 9 are views similar to Fig. 7, but illustrating the parts in different positions.

Fig. 10 is a transverse section through the machine on line 10—10 of Fig. 4, illustrating the sample magazines and the sample-applying means.

Fig. 11 is a sectional detail view illustrating one of the sample pick-up devices in elevation.

Fig. 12 is a section on line 12—12 of Fig. 11.

Fig. 13 is a bottom plan view of the parts shown in Fig. 11.

Fig. 14 is a horizontal section on line 14—14 of Fig. 11.

Fig. 15 is a longitudinal sectional view of a portion of the machine, taken on line 15—15 of Fig. 16, and illustrating the detector devices, the sample-pressing devices, and the means for turning over a page of a book.

Fig. 16 is a top plan view of the section of the machine shown in Fig. 15.

Fig. 17 is an elevational detail view of the page-turning means.

Fig. 18 is a longitudinal section through a portion of the machine illustrating the detector devices in a different position from that shown in Fig. 15.

Fig. 19 is a transverse section in the plane of line 19—19 of Fig. 18.

Fig. 20 is a transverse section in the plane of line 20—20 of Fig. 18.

Fig. 21 is an elevational view illustrating a portion of the driving mechanism.

Fig. 22 is a horizontal sectional view in the plane of line 22—22 of Fig. 21.

Fig. 23 is a sectional detail on line 23—23 of Fig. 24.

Fig. 24 is a sectional view in the plane of line 24—24 of Fig. 21.

Fig. 25 is a plan view of a set of sample magazines, looking in the plane of line 25—25 of Fig. 7.

Fig. 26 is a horizontal sectional view through the magazines and the lint exhaust means taken in the plane of line 26—26 of Fig. 7.

Fig. 27 is a fragmental elevation of the sample magazines.

Fig. 28 is a detail perspective view of one of the guards for the upper ends of the sample magazines.

Fig. 29 is a horizontal sectional view of the adhesive-applying means taken on line 29—29 of Fig. 5.

Fig. 30 is a diagrammatic view illustrating the electrical connections for the detector and signal devices.

Fig. 31 is a transverse section through the machine on line 31—31 of Fig. 1, illustrating a portion of the driving mechanism.

Fig. 32 is a detail perspective view of a portion of one of the sample magazines.

My invention is capable of embodiment in many different forms, only one of which is represented in the machine disclosed herein. The following detailed description of this exemplary machine, therefore, is not to be considered as a limitation of my invention in any way. The scope of the invention will be pointed out in the appended claims.

The present machine is arranged to apply samples to the successive sheets or pages of a bound catalogue or book. The books are caused to travel through the machine and the sheets of the book to which samples are to be applied are subjected to similar treatment by the successive sections of the machine. This treatment consists first in applying an adhesive substance to the place or places on the sheet where samples are to be affixed. The book then passes above a plurality of sample magazines and beneath a series of devices for applying samples to the glued places on the sheet, said devices having picked up samples from the magazines prior to the approach of the book. After the samples are deposited on the glued places on the sheet, the book passes into association with detector devices which operate to detect the absence of a sample on a space where it should be, thereby acting as a check upon the accuracy of the sample-applying means. If a sample be missing from a space where it should be, the detector devices stop the machine and cause a signal lamp to be lighted at that point. The operator then remedies the difficulty and the book passes on beneath a set of rollers which act to press the samples down firmly against the sheet. After this is done, the sheet is picked up and turned over by the sheet-turning means, so as to present a new sheet for treatment.

The mechanisms just mentioned may be said to constitute one section or unit of the entire machine and as many of these units are provided as is necessary to act upon the number of sheets in any book to be treated.

*The book-supporting and conveying means.*

The present machine comprises a suitably supported bed 35 upon which the various mechanisms are mounted. The books are indicated by reference character *a* and are supported upon plates 36 which have their edges engaging in suitable guideways 37 in the bed. These plates are arranged to be moved one after the other through the machine by means of a pair of endless conveyer chains 38 which are mounted on suitable sprocket wheels 39 and are provided with upstanding projections 40 to engage the rear edges of the plates 36 and slide them along their guideways. The sprocket chains 38 are intermittently driven by a pair of sprocket wheels 41 (see Figs. 4 and 31) mounted on a shaft 42 which is actuated by a worm wheel 43 fixed thereon and meshing with a worm 44 which is fixed on a clutch sleeve 45 loose on the main drive shaft 46 (Figs. 1 and 2) running along one side of the bed 35. The sleeve 45 drives the conveyer and the shaft 46 drives the operating mechanisms, and said sleeve and shaft are alternately driven by clutch means to be later described. 49 are idler rolls on which the lower runs of the conveyer chains rest. The book-supporting plates 36 may be provided on their upper sides with clips 47 by which the books are positioned and secured on said plates. To the underside of the plates 36 are fixed a series of contact plates 48 (see Fig. 3) to coöperate with the detector mechanism which will be later described.

*The adhesive applying means.*

The mechanism for applying adhesive to the sheet comprises a tank 50 (Figs. 4, 5 and 6) located in a plane beneath the path of the book-supporting plates 36 and adapted to contain a quantity of adhesive substance such as liquid glue. In this tank are mounted two rollers 51 over which one or more absorbent endless tapes 52 travel. The tapes may be held taut by an idler roll 53 resting on the lower run of the tapes and having its journals slidably engaging in vertical guideways 54 on the tank walls. The upper runs of the tapes travel over a stationary table or platen 55. The top wall of the tank 50 has a plurality of openings 56 therein through which glue-applying fingers pass into contact with the tapes 52 to receive a charge of glue.

A vertically reciprocatory frame or support 57 is mounted in guideways 58 at opposite sides of the bed. The frame 57 supports a plurality of downwardly projecting fingers 59 adapted to be lowered into engagement with the tapes 52 and then brought into contact with a sheet in the book $a$, the fingers being arranged in groups spaced apart and located to properly apply the glue to the desired points on the page. These fingers, in the present instance, are arranged in two sets of four groups each, as shown in Fig. 29, and are secured to a pair of similar plates 60. Each of said plates 60 is slidably mounted on guide-pins 61 seated in a cross-bar 62. The plates 60 are adapted to yield upwardly against the action of springs 63 when the fingers are brought into contact with the tapes 52 or book $a$. The ends of the two cross-bars 62 are mounted on two plates 64 which in turn are removably mounted on the supporting frame 57. Stripping means is provided to prevent the sheet from adhering to the fingers 59, said stripping means being in the form of plates 65 having openings 66 through which the fingers 59 pass, said plates being carried by depending pins 67 and being arranged to yield upwardly against the action of compression springs 68 surrounding said pins. The entire gluing device may be easily removed from its supporting frame 57 to permit repair or substitution of another device.

The gluing mechanism is driven by a horizontal cross-shaft 69 mounted in the bed and having a worm wheel 70 fixed thereon, which meshes with a worm 71 fixed on the main drive shaft 46. On the opposite end of the shaft 69 is fixed a pinion 72 which meshes with a gear 73 fixed on the shaft of one of the rollers 51. Cams 74 are fixed on opposite ends of the shaft 69 and have grooves 75 in their inner faces to receive rollers 76 carried by the vertically slidable frame 57. The grooves 75 are so formed that the gluing fingers 59 are first carried downwardly into engagement with the tapes 52 to receive a charge of glue, are then raised to a plane above the path of the book supports 36 to permit a book to be moved under the fingers, and the fingers are then depressed into engagement with the sheet to deposit glue thereon, and are then raised again to original position. The rollers 76 are fixed on a shaft 77 carried by blocks 78 (Fig. 5) which have an adjustable mounting on the frame 57, as by a screw and slot connection 79, so that the position of the frame 57 as a whole may be changed to accommodate books of different thicknesses. The cams may be notched as at 80 to permit withdrawal of the rollers 76 and the removal of the entire frame 57 from the machine for repair or the like.

*The sample-applying mechanism.*

The sample-applying mechanism comprises a plurality of vertical sample magazines 85 (see Figs. 4, 7, 10, 25 to 28 and 32) suspended beneath the path of the book-supports 36 and arranged in the relation the samples are to assume on the page of the book. Each magazine contains a stack of samples $b$ of the same character and which is of a different character from the samples in any other magazine. Each magazine comprises an upper section 85$^a$ which is stationarily mounted and a lower section 85$^b$ which is removably supported on said upper section. The upper sections of the magazines have perforated walls to permit the escape of any lint which may be rubbed from the edge of the stack of samples, and said upper sections are surrounded or inclosed by a housing 86 which is connected by a conduit 87 (Figs. 7 and 10) with a suitable exhaust fan (not shown) so that the lint will be drawn away from the machine to prevent the lint from clogging the working parts.

The upper ends of the lower section have flanges 88 (see Figs. 27 and 32) to removably engage in guides on the upper section, a spring latch 89 pivoted on the housing 86 being arranged to engage in an opening 90 in a flange of the lower section to lock the two sections together. The samples are supported in each magazine by means of a vertically movable false bottom 91 (Fig. 7), flexible cords 92 being attached thereto and passing upwardly over sheaves 93 fixed to the lower magazine section and thence downwardly to support a counterweight 94.

The extreme upper ends of the magazines are provided with means to overhang the columns of samples and prevent the counterweights 94 from ejecting the samples upwardly (see Fig. 25). This overhanging means, in the present instance, comprises a top plate 95 overlying all of the magazines and having openings 96 registering therewith, said openings having beveled walls; and guard plates 98 (Fig. 28) adjustably mounted on said plate, as by screws 99 seated in the plate 95 and passing through slots 100 in the guard plates, the latter being arranged to be adjusted to different degrees of projection over the openings 96 according to the different qualities of samples to be contained in the magazines.

Above the magazines are mounted a plurality of sample-selecting or pick-up devices, one for each magazine. (See Figs. 7 to 14.) These devices are mounted upon a head comprising two horizontal plates 110 and 111 which are spaced apart and rigidly secured together, and are removably mounted as a unit on a support or frame 112, the latter being mounted for vertical reciprocating movement in guideways 113 at opposite sides of the bed 35. The head may be readily removed for repair or replacement by a duplicate head.

Each of the sample-selecting or pick-up devices is arranged to engage the top sample in one of the magazines and exert a tensional stress on the sample so that it may be separated from the column of samples and withdrawn from the magazine. Each device comprises members which are equipped with sharp points arranged to enter the sample, the members being then spread apart so that the sample will be stretched taut and may be removed. The members 114 (Fig. 11) in the present instance are in the form of a pair of jaws which are pivoted in and depend from brackets 115 fixed to the underside of the lower supporting plate 111. Each of the jaws 114 carries at its lower end sharp pointed needles 116 which are adjustably mounted in an angular position in the jaws by means of set screws 117 (Fig. 7), the needles of the two jaws of a pair pointing away from each other.

The jaws are arranged to be swung by curved links 118 extending through openings in the lower supporting plate 111 and carrying pins at their lower ends which engage in slots in outwardly projecting lugs 119 on the jaws 114, the upper ends of the links 118 being pivoted to ears on a collar 120 which is screw threaded on a vertical screw rod 121 (Fig. 12) passing through both of the supporting plates 110 and 111. Sleeves 122 and 123 threaded on the rod at opposite sides of the collar 120 secure the latter against displacement and also provide bearings by means of which the screw-rod is freely slidable in the supporting plates 110, 111.

The lower end of the rod 121 carries means arranged to strip the sample off the needles 116 at the proper time, said means comprising a plate 124 carrying a pair of guide rods 125 which pass slidably upward through the lower supporting plate 111, and a flexible plate 126 fixed on and disposed at right angles to the plate 124, the opposite ends of said flexible plate extending beneath the two jaws 114 and being bifurcated to accommodate the needles 116 as indicated most clearly in Fig. 13. The plate 124 is rigidly secured by pins 127 (Fig. 12) to a collar 128 which is slidably mounted on the rod 121, said collar being normally pressed downwardly against an adjustable stop nut 129 on the rod by means of a coiled spring 130 surrounding the rod between the collar 128 and the lower supporting plate 111. It will be seen that the stripper means as a whole has a sliding or lost-motion connection with the lower end of the screw-rod 121. The spring 130 tends to draw the rod 121 downwardly.

A collar 131 loosely surrounds the screw rod 121 above the upper supporting plate 110 and is relatively movable longitudinally of the screw rod. Upward movement of the collar is limited by a pair of lock nuts 132 threaded on the rod. A coiled compression spring 133 surrounds the rod between the collar 131 and the upper supporting plate 110 and tends to draw the rod upwardly so as to spread the jaws 114 apart. The spring 133 is arranged to be held under compression so as to neutralize its action on the rod 121 by means of two opposed dogs 134 pivoted in ears on the collar 131 and depending through holes 135 in the top supporting plate 110, said dogs being arranged to engage beneath said supporting plate, as shown in Fig. 12. The dogs are drawn toward each other by a connecting spring 136 and are arranged to be spread apart by lugs on the collar 120 camming against the noses of said dogs. When the dogs are unlatched the spring 133 quickly moves the rod 121 upwardly to spread the jaws 114 apart.

Means is provided for restoring the jaws to their drawn-together position so as to release a sample at the proper time and to cause the jaws to be so locked by the dogs 134. This restoring means comprises a lever 137 (Fig. 11) pivoted between its ends on a bracket 138 which is fixed to one of the supporting plates 110, 111. One end of the lever is pivotally connected to the collar 120 and the opposite end has a pin and slot connection 139 with a plunger 140 which is vertically slidable in the supporting plates 110 and 111. A coiled spring 141 surrounding the plunger tends normally to press the latter downwardly. For purposes of adjustment the plunger is preferably made in two parts having a screw thread connection and held by the lock nut 142. An arm 143 is pivoted at one end in a bracket 144 fixed to one of the plates 110, 111, and at its other end is pivoted to the collar 120, at the opposite side from the lever 137.

The operation of the pick-up devices will best be understood by a comparison of Figs. 7, 8 and 9 in connection with Figs. 11 to 14. Fig. 11 illustrates a device in its normal position in which it is ready to descend and pick up a sample from a magazine. Fig. 8 illustrates two pick-up devices just engaging with the top samples in the magazines. Fig. 7 illustrates the devices after they have removed samples from the magazines and risen to a plane above the path of the book carriers. Fig. 9 shows the devices as having descended again and as just depositing the samples on the book.

By comparing Fig. 11 with Fig. 8, it will be seen that the stripper device mounted on the lower end of the screw-rod 121 has engaged the top of the column of samples and yielded upwardly with respect to said screw-rod, as permitted by the lost motion connection between these parts and against the opposition of the compression spring 130. In the next instant the noses of the dogs 134 will engage the collar 120 which will move said dogs out of engagement with the plate 110, whereupon the top compression spring 133 assisted by the spring 141 of the restoring device will quickly draw the screw-rod 121 upwardly and through the curved links 118 will quickly spread the jaws 114 outwardly away from each other. In this movement of the jaws, the needles 116 engage and stretch the top sample of the stack, so that when the device rises said sample will be withdrawn from the magazine. Fig. 7 indicates the manner in which the sample is supported in stretched condition by the pick-up device and shows a book in position beneath the pick-up devices and ready to receive samples therefrom. The resiliency of the column of samples is of assistance in permitting the proper separation of the top sample from its column.

In the subsequent downward movement of the supporting frame, the restoring plunger 140 of each pick-up device will engage the book *a* and will, through the medium of the lever 137, and against the opposition of springs 133 and 141, move the screw-rod 121 downwardly and cause the dogs 134 to latch beneath the top supporting plate 110. The descent of the screw-rod will, through the medium of the collar 120 and links 118, swing the jaws 114 toward each other to release the sample supported thereby, the sample having in the meantime been carried against the sheet of the book and the stripper device having been forced to yield upwardly in opposition to the spring 130. As the supporting frame 112 again rises, the stripper device will remain in engagement with the sample while the lost motion is being taken up by the spring 130, so that there will be no danger of samples clinging to the jaws 114. The stripper also serves to press the sample against the sheet.

The frame 112 which supports the pick-up devices is arranged to be moved up and down by means of two cams 146 (Figs. 7 to 10) positioned at opposite sides of the bed 35 and fixed upon a transverse shaft 147 mounted in said bed, said cams having grooves 148 on their inner faces to receive rollers 149 carried by opposite sides of the frame 112. The shaft 147 is rotated by means of a worm wheel 150 (Figs. 1, 10 and 21) fixed thereon and meshing with a worm 151 fixed on the main drive-shaft 46. The rollers are carried by blocks 152 (Fig. 10) which have an adjustable screw and slot connection with the frame 112 so that the latter may be adjusted to accommodate books of different thickness. The cams 146 may be notched as at 153 (Fig. 7) to permit removal of the frame 112 from the machine for repair or substitution of pick-up devices.

*Actuating mechanism.*

The mechanism for actuating the main drive shaft 46 and the conveyer driving sleeve 45 (see Figs. 1, 2 and 21 to 24) comprises an electric motor 160 which is connected by a belt 161 to a sheave fixed on a sliding clutch sleeve 162, said sleeve being rotatably mounted on the main drive shaft 46. One end of this clutch sleeve is arranged to engage a clutch element 163 fixed to the conveyer driving sleeve 45. The other end of the clutch sleeve is arranged to engage with a clutch element 164 fixed rigidly to the drive-shaft 46. Means is provided for shifting the clutch sleeve into alternate engagement with the elements 163 and 164, said means comprising a slidable rod 165 mounted in brackets 166 on the bed 35 and carrying at one end a yoke 167 which engages the clutch sleeve 162. The clutch sleeve and the rod 165 are shifted in one direction by means of a coiled compression spring 168 (Fig. 21) embodied in the clutch element 163 on the worm sleeve 45. This spring tends at all times to maintain the clutch sleeve 162 in engagement with the clutch element 164 on the drive shaft. The clutch sleeve is moved in the opposite direction by two projections 169 fixed to diametrically opposite points on the worm gear 150 which actuates the first set of sample pick-up devices. At every half revolution of said worm gear one of the projections 169 will be carried into engagement with an upstanding projection 170 on the clutch shifter rod 165 and will thereby longitudinally move said rod in opposition to the spring 168 and into such engagement with the worm sleeve 45. 171 indicates a weight secured to the shifter rod 165 and depending therefrom to maintain the projection 170 in an upright position in the path of the projections 169.

As soon as the clutch sleeve 162 is moved out of engagement with the element on the drive-shaft 46, said shaft and all of the operating mechanisms driven thereby immediately stop, and the book-conveyer 38 is at the same time started in operation to advance the books one step. When one of the book-supporting plates 36 arrives at the proper position to be acted on by the first sample-applying mechanism, the leading edge of said plate engages an arm 172 (see Fig. 23) which is pivoted to the inner side of the bed and which carries a rod 173 passing out through a slot 174 in the bed and fixed at its outer end to a vertically sliding bar 175 mounted in brackets 176 on the outer side of the bed. This bar carries means for rotating the clutch shifter rod, said means comprising a pivoted spring-pressed dog 177 carried by the bar and arranged to engage a projection 178 on the shifter rod to rotate said rod. A spring 179 tends to raise the bar 175 and the pivoted arm 172 to maintain the latter in position to be engaged by the advancing book-supporting plate. In the upward movement of the bar the dog 177 yields to pass the projection 178 on the shifter rod but in the downward movement of said bar as caused by the arm 172, the dog stops against a pin 180 on the bar and remains rigid so that the clutch shifter rod 165 will be rotated. This rotation of said rod moves the projection 170 out of the path of the projection 169 on the worm wheel 150 and the spring 168 instantly shifts the rod 165 longitudinally to disengage the clutch sleeve from the worm sleeve 45 and engages the clutch sleeve with the element on the drive-shaft 46. Thus the drive-shaft will be actuated to operate the various mechanisms through a half revolution.

The detector means.

If any one of the sample pick-up devices should fail to take a sample or should fail to deposit it upon the sheet, it is desirable that the operator be notified of this condition before the book proceeds farther. Means is therefore provided to detect the absence of a sample, and to stop the machine and signal the operator if a sample is missing. This means is best illustrated in Figs. 15, 16, 18, 19, 20 and 30, and comprises a plurality of rollers 186 positioned above the path of the book and so located that every sample on the sheet will pass under and in contact with one or another of said rollers. Each of these rollers is mounted in one end of a lever 187 which is pivoted on a rod 188 extending across the bed. The other end of the lever carries a contact device 189 insulated from the lever and forming the movable element of an electric switch to coöperate with a stationary switch element in the form of a bar 190 extending across the bed 35 and insulated therefrom. 191 indicates wires each of which is connected to one of the lever contacts 189, and 192 indicates a wire which is attached to the bar 190. Coiled torsion springs 193 each engaging one of the levers 187 tend to swing the lever to maintain the rollers down and to close the switch. Two transverse conductor bars 194 and 195 are mounted in and insulated from the bed 35 beneath the path of the book-supports 36, and projecting upwardly from each of these bars is a plurality of contact springs or brushes 196 adapted to engage the contact plates 48 (see Fig. 3) on the bottom of the book-supporting plates 36.

Referring to Fig. 30, 197 indicates the supply wires to furnish power to the driving motor 160 of the machine. One of these wires is connected to a switch 198 to make and break the circuit to the motor. The switch 198 tends to remain closed and is arranged to be opened by an electromagnet 199 which is supplied with current by a battery 200. The battery and magnet are connected to two wires 201 which run along the entire length of the machine and to which all of the detecting mechanisms of the several units or sections of the machine are connected. Fig. 30 shows two independent detecting mechanisms by way of example. One of the lower bars 195 is connected by a wire 202 with the contact piece 189 on one of the detector levers 187. Similar wires connect said bar 195 with each of the other detector levers. The other bar 194 has attached thereto a wire 203 which connects with an incandescent lamp 204 to provide a signal, and then connects with one of the wires 201. The other wire 201 is connected by the wire 192 to the top conductor bar 190. Each of the contact plates 48 on the book-supporting plate is arranged to bridge or connect a pair of the spring contacts or brushes 196 on the two lower conductor bars 194, 195. The battery and electromagnet circuit is open at this point except when the contact plates 48 pass into engagement with the brushes 196. If a sample is present on the sheet above any contact plate, the detector roller 186 rides up on the sample and moves its contact device 189 away from the upper conductor bar 190 to open the circuit there before the closing of the circuit by the contact plate 48. Therefore, so long as samples are properly placed on the sheet, the circuit through the electromagnet 200 will be maintained open at one point or another and the motor switch 198 will be left closed to continuously supply power to the driving motor 160 of the machine. If, however, a sample is missing from the sheet, the contact plate 48 will bridge the two brushes 196 as usual, but the roller 186 will not be raised so that the circuit will remain closed between the contact piece 189 of the detector and the upper conductor bar 190 and current will be sent through the electromagnet 199 which will open the motor switch 198 and stop the machine. At the same time the signal lamp 204 which may be mounted on the outer side of the bed 35 opposite the detector devices is lighted so that the operator can see which section of the machine has failed and has caused the stoppage. The operator then proceeds to that section of the machine and remedies the difficulty which may, for example, be caused by the exhaustion of one of the columns of samples in the magazines.

Sample pressing means.

When the machine is again started in operation, the book support 36 carries the book beneath a series of pressing rollers 210 (Figs. 1, 4ª, 15 and 16), each of which is rotatably mounted in the lower end of an arm 211 pivoted on a cross-rod 212 on the bed 35. Springs 213 press the arms 211 downwardly and the rollers are so arranged that each sample will pass beneath one of the rollers and will be thereby pressed tightly against the sheet.

Sheet-turning means.

In its further travel the book is carried into association with sheet-turning means which is best illustrated in Figs. 2, 4ª, 15, 16 and 17. This means comprises a rock-shaft 215 rotatably mounted in bearings on the bed 35 above the path of the book and having fixed thereon a pair of arms 216 projecting in a direction opposite to the travel of the book and adjustably carrying at their free ends suction means adapted to pick up a sheet. This suction means comprises a horizontal tube 217 from which depends a plurality of flexible rubber suction cups 218 connected with said tube and so arranged that in the downward swinging movement of the arms 216 the cups will be pressed against the sheet and carry the latter upward as the cups rise, in a manner clearly indicated in Fig. 15. The horizontal tube 217 has a conduit 219 leading to suitable exhaust pump (not shown) for maintaining a partial vacuum in the tube 217. The sheet is raised to a suitable height by the suction means and maintained in that position for an interval of time. As the book continues to travel the lower face of the sheet is carried into engagement with a stationary cross-rod 220 mounted on the bed above the path of the books and this rod strips the sheet away from the suction cups 218 and folds the sheet over onto the opposite side of the book.

The rock-shaft 215 is arranged to be operated by a cam 221 mounted on a stub shaft on the bed and having on its inner face a cam groove 222 (Fig. 17) to receive a roller 223 carried by an arm 224 which is fixed to said rock-shaft. The cam groove comprises a concentric dwell portion of about 180 degrees and an actuating portion. A worm wheel 225 fixed with relation to the cam 221 meshes with a worm 226 fixed on the main drive shaft 46 (see Fig. 1).

Operation.

In the operation of the machine, the books or catalogues $a$ are secured to their respective supporting plates 36 and the latter are started in their guideways at the head end of the machine in position to be engaged by the conveyer chains 38. This may be done during the period of stoppage of the chains. Meanwhile the operating mechanisms have gone through the following operations: The glue-applying fingers 59 have descended into engagement with the tapes 52 and have risen again; the sample-selecting devices have descended to pick up a set of samples and have risen to normal position; and the leaf-turning suction devices 218 have descended into engagement with the leaf and raised the latter. In this position of the parts the clutch sleeve 162 is shifted from the main drive-shaft 46 to the conveyer driving sleeve 45, whereupon the operating mechanisms will stop and the conveyer 38 will be actuated to move the books into operative relation to the gluing mechanism and the sample-applying mechanism and to move other books past the detector means, the pressing means, and the sheet-turning means, so that the latter will complete the turning over of a sheet. The clutch sleeve 162 will then be shifted again and the operating mechanisms will perform the following functions: The gluing fingers will descend into contact with the sheet and rise again; the sample pick-up devices will descend to deposit their samples upon the sheet and will return to normal elevated position; and the leaf-turning suction devices will be held idly in elevated position by the dwells in their actuating cams.

The clutch sleeve will now be shifted to the conveyer again and the books to which glue and samples have just been applied will be carried out of association with the gluing and sample-applying mechanisms, leaving said mechanisms free to again descend into engagement with the gluing tapes and the stacks of samples, respectively. This completes one cycle of the machine and the operations are then repeated. When the machine is running full of books a complete book will be filled with samples at every cycle of the machine. If any unit of the machine fails to affix a sample where it should be, the entire machine is stopped and a signal lamp lighted at the particular point on the machine where the miss occurs. The operator's attention is thus immediately drawn to the source of trouble. Whenever any of the magazines need refilling, the operator removes the lower section 85$^b$ thereof, as indicated in dotted lines in Fig. 7, places a new column of samples therein, and returns it to proper place.

From the foregoing description it will be apparent that many changes and modifications in the disclosed embodiment may be made, without departing from the spirit and scope of the invention, and while retaining its essential characteristics. For example, the relative movement between the sheets and the operating mechanisms may be effected in a different manner. Many other modifications might be mentioned.

I claim as my invention:

1. A machine of the character described having, in combination, means for supporting a sheet, means for applying an adhesive substance to the sheet, a sample magazine adapted to contain a stack of samples, and means having a reciprocatory part to engage in the end sample of the stack, remove it from the stack of samples, and apply it to the adhesive treated sheet, said sheet supporting means being movable into and out of the path of movement of the reciprocatory part.

2. A machine of the class described having, in combination, means for applying an adhesive substance to a sheet, sample-affixing means, and means for moving a sheet from the adhesive applying means to the affixing means, said sample-affixing means comprising a holder mounted below the sheet moving means and a support movable up and down above the sheet moving means and carrying a device adapted to engage a sample in the holder, remove it from the holder and place it upon the adhesive treated sheet.

3. A machine of the character described having, in combination, adhesive-applying means, a series of magazines each adapted to contain a stack of samples, means located directly above said magazines for taking samples from said magazines and placing them on a sheet, and means for causing relative traveling movement between a sheet on the one hand and said adhesive-applying means and sample-taking means on the other, the two latter means being mounted above the plane of the sheet and said magazines being mounted below the plane of the sheet.

4. A machine of the character described having, in combination, adhesive-applying means comprising a vertically movable support carrying a plurality of adhesive-applying devices, sample-applying mechanism comprising a vertically movable support carrying a plurality of sample-engaging devices, a plurality of magazines located beneath said sample-engaging devices and adapted to supply the latter, a conveyer arranged to carry sheets beneath the applying devices of the adhesive-applying means and between said sample-engaging devices and said magazines, and actuating mechanism arranged to advance the conveyer intermittently and to cause reciprocation of the mentioned supports of the adhesive-applying means and sample-applying means during the interval of stoppage of said conveyer.

5. A machine for affixing samples to sheets having, in combination, a sheet support movable in a horizontal plane, a vertically reciprocatory frame having devices thereon movable relative thereto and arranged to operate upon the flat surface of the sheet to apply a material thereto, means for supplying the material to be applied located in the plane of movement of the devices, and means for alternately actuating said sheet support and frame, said devices being moved alternately into engagement with the material supplying means and a sheet.

6. A machine for affixing samples to sheets having, in combination, a sheet support movable in a horizontal plane, a plurality of devices mounted for vertical movement and arranged to operate upon the flat surface of the sheet to apply a material thereto, means for supplying the material to be applied located in the plane of movement of said devices, and means for alternately moving said sheet support and the operating devices, said devices being moved alternately into engagement with the material supplying means and a sheet.

7. A machine for affixing samples to sheets having, in combination, a flat support for a sheet, means for supporting a sample, a reciprocatory element having a device for applying an adhesive substance to the sheet, a second reciprocatory element having a device movable relative thereto and arranged to pick up a sample and apply it to the adhesive substance on the sheet, and means for reciprocating said elements, the pick-up device on said second element being actuated solely by engagement with the sample and the flat surface of the sheet.

8. A machine for affixing samples to sheets having, in combination, a flat support for a sheet, means for supporting a sample, a reciprocatory support, a device movable on said support and arranged to pick up a sample and apply it to the flat surface of the sheet, and means for reciprocating said support, said device being adapted to be actuated solely by engagement with the sample and the sheet.

9. A machine for affixing samples to sheets having, in combination, a magazine adapted to movably support a stack of cloth samples, a device for successively removing samples from the magazine, said magazine having perforated walls to permit the escape of lint drawn from the samples, and a suction conduit surrounding the magazine.

10. A machine for affixing samples to sheets having, in combination, a magazine adapted to contain a stack of samples and comprising a stationary upper section and a lower section removably mounted on said upper section, means in the lower section tending to force the samples upwardly in the magazine, means for removing from the magazine samples to be applied to the sheets, the walls of the upper section being perforated to permit the escape of lint, and a conduit for drawing off the lint.

11. A sample affixing machine having, in combination, a magazine for movably supporting a stack of cloth samples, and means for selecting a sample from said magazine and applying it to a sheet, the walls of the magazine being perforated longitudinally thereof to permit the escape of lint drawn from the samples.

12. A machine for affixing samples to sheets having, in combination, a support, means mounted on said support for supporting a stack of samples, means for supporting a sheet, and means adapted to engage with the end sample, remove it from the stack and apply it to the sheet, said sheet supporting means being movable into and out of the path of movement of the sample applying means to enable the sample applying means to move across the path of movement of the sheet supporting means.

13. A machine for affixing samples to sheets having, in combination, a magazine adapted to movably support a stack of samples, comprising two sections mounted one upon the other, and a device for successively removing samples from the magazine, one section of said magazine being removable from the other to permit the magazine to be replenished.

14. A machine for affixing samples to sheets having, in combination, means for supporting a sheet, an upright tube adapted to contain a stack of samples, means tending to force the stack upwardly, devices overlying the edges of the upper end of the stack adjustable toward and from the center of the tube and devices for singly and successively removing samples from the upper end of the stack and applying them to the sheet.

15. A machine for affixing samples to sheets having, in combination, means for supporting a sheet, means for supporting a stack of samples, means adapted to positively engage and tension the end sample, remove it from the stack and then deposit it upon the sheet, and means for preventing the escape with such removed sample of the next succeeding sample.

16. A machine for affixing samples to sheets having, in combination, means for supporting a sheet, a magazine for supporting a column of samples, and means for picking up a sample and applying it to the sheet, said magazine comprising an upper section and a lower section having a removable association with said upper section, the lower section carrying a false bottom, and means tending to raise said bottom.

17. A machine for affixing samples to sheets having, in combination, means for supporting sheets, a magazine for supporting a column of samples, and means for picking up the samples singly and successively and applying them to the sheets, said magazine comprising a tube, a plate at one end of said tube and having an opening registering with one end of the tube, said opening having beveled walls to overlie the interior of the tube, and guards adjustably mounted on said plate overhanging the opening therein.

18. A machine for affixing samples to sheets having, in combination, means for supporting a sheet, means for supporting a stack of samples, and means for singly and successively picking up a sample and applying it to the sheet, said sample-supporting means including a tube adapted to receive the samples, a plate at one end of said tube and having an opening registering with the tube, the walls of said opening being beveled and overhanging the interior of the tube.

19. A machine for affixing samples to sheets having, in combination, means for supporting a sheet, a magazine for supporting a column of samples, and means for picking up a sample and applying it to the sheet, said magazine comprising an upper section and a lower section, the latter having a transversely sliding and removable connection with the former, and a latch for securing the lower section in place beneath the upper section.

20. A sample affixing machine having, in combination, a stationary support, means for applying an adhesive substance to a sheet, means for supporting a stack of cloth samples, and a member movably mounted on the support and provided with reciprocatory means having sharp points arranged to engage in and remove the samples from the stack singly and successively and apply them to the adhesive substance on the sheet, said sample supporting means being located in the plane of movement of said movable member.

21. A sample affixing machine having, in combination, a stationary support, means for applying an adhesive substance to sheets, a vertically disposed magazine adapted to contain a stack of cloth samples, and a member movably mounted on the support and provided with reciprocatory means having a sharp point arranged to successively engage in and pick up the top samples from the stack and apply them to the adhesive substance on the sheets, said member being movable in the vertical plane of said magazine.

22. A sample affixing machine having, in combination, a stationary support, means for supporting a sheet, means for applying an adhesive substance to the sheet, a magazine adapted to contain a plurality of cloth samples, and a member mounted on the support and provided with a reciprocatory device having a sharp point arranged to engage in and remove successive samples from said magazine and apply them to the adhesive substance on the sheet, said member being movable in the plane of said magazine.

23. A machine for affixing samples to sheets having, in combination, means for supporting a sheet, means for supporting a stack of samples, and a device arranged to positively engage in and tension a sample to remove it from the stack and to release and apply it to the sheet.

24. A machine for affixing samples to sheets having, in combination, means for supporting a sheet; means for supporting a stack of cloth samples; and a device for removing a sample from the stack and applying it to the sheet comprising a pair of jaws having sharp points adapted to enter the cloth, spread apart to hold the sample stretched and then move toward each other to release the sample.

25. A machine for affixing samples to sheets having, in combination, means for supporting a sheet; means for supporting a stack of cloth samples; and a device for removing a sample from the stack and applying it to the sheet comprising a pair of pivoted members having sharp points, means for holding said members in position to engage the sample, means for spreading said members apart after they have engaged the sample so as to tension the latter, means for locking said members in their separated position, and means for releasing said locking means to permit the members to move toward each other to deposit the sample upon the sheet.

26. A machine for affixing samples to sheets having, in combination, means for supporting a sheet; means for supporting a sample; and a device comprising members having sharp points, means for operating said members to engage and stretch a sample whereby to pick up the sample, and means for operating said members to release the sample and deposit it upon the sheet.

27. A machine for affixing samples to sheets having, in combination, means for supporting a sheet; means for supporting a sample; and a device comprising arms having adjustable sharp pointed members, means for operating said arms to cause its pointed members to engage in and stretch a sample whereby to pick up the sample, and means for operating said arms to release the sample and deposit it upon the sheet.

28. A machine for affixing samples to sheets having, in combination, means for supporting a sheet; means for supporting a sample; and a device for picking up a sample and depositing it upon a sheet including a pair of pivoted jaws having sharp points to engage in the sample, means tending to spread said jaws apart, means for locking said members in their drawn-together position, and means adapted to be actuated by engagement with the sample to be picked up for tripping said locking means to permit the jaws to spread apart and stretch the sample.

29. A machine for affixing samples to sheets having, in combination, means for supporting a sheet; means for supporting a sample; and means for picking up the sample and applying it to the sheet, including a pair of pivoted jaws adapted to engage the sample, a rod between said jaws and connected thereto for moving the jaws, a spring acting between said rod and tending to spread the jaws apart, a locking dog for opposing said spring, means for tripping said locking dog to release the spring, and means acting on said rod for restoring said jaws to their drawn-together position.

30. A machine for affixing samples to sheets having, in combination, means for supporting a sheet; means for supporting a sample; and means for picking up the sample and applying it to the sheet including opposed members having sharp points to engage in the sample; spring means tending to spread said members apart, locking members opposing said spring means, means operable by engagement with the sample for tripping said locking means, and means for restoring said members to their drawn-together position.

31. A machine for affixing samples to sheets having, in combination, means for supporting a sheet; means for supporting a sample; and a device arranged to pick up the sample and apply it to the sheet including a pair of opposed members, spring means tending to spread said members apart; and means for moving said members toward each other.

32. A machine for affixing samples to sheets having, in combination, a flat support for a sheet; means for supporting a sample; and a device arranged to pick up the sample and apply it to the flat surface of the sheet including a member for engaging and retaing a sample, and means operable solely by engagement with the sheet for stripping the sample from said member.

33. A machine for affixing samples to sheets having, in combination, a flat support for a sheet; means for supporting a cloth sample; and a device arranged to pick up the sample and apply it to the flat surface of the sheet including a member having a sharp point arranged to engage in the sample, and member operable solely by engagement with the sheet for stripping the sample from said pointed member.

34. A machine for affixing samples to sheets having, in combination, a flat support for a sheet; means for supporting samples; means for picking up a sample and depositing it upon the sheet including a device arranged to successively engage and release a sample, and means for moving said device relative to the sheet to cause it to act to pick up the sample with which it engages and to deposit it upon the sheet, said device being operable solely by engagement with the sample and the flat surface of the sheet.

35. A machine for affixing samples to sheets having, in combination, means for supporting a sheet; means for supporting samples; and means for picking up a sample and depositing it upon the sheet, including a pair of pivoted members having means for positively engaging in the sample, and means coöperating with said members arranged to be operated by engagement with the sample and the sheet to actuate said pivoted members.

36. A machine for affixing samples to sheets comprising, in combination, means for supporting a stack of samples, sample applying means vertically reciprocable above the sample supporting means, means for carrying a plurality of sheets spaced apart between said sample applying means and said sample supporting means, and means for reciprocating said sample applying means first to pick up a sample and then into engagement with a sheet to apply the sample thereto.

37. A machine for affixing samples to sheets having, in combination, means for supporting a sheet, means for supporting a plurality of samples, a support movable above the samples, and a plurality of pivoted devices carried by said support adapted to simultaneously pick up samples and to deposit them upon the sheet.

38. A machine for affixing samples to sheets having, in combination, means for supporting a sheet, a plurality of upright magazines each arranged to support a stack of samples, a support having automatically and independently operable devices for picking up samples from said magazines and applying them to the sheet, and means for moving said support to cause said devices to act to pick up the top samples from the magazines and to deposit them upon the sheet.

39. A machine for affixing samples to sheets having, in combination, means for supporting a sheet, a plurality of upright magazines each arranged to support a stack of samples, a vertically movable support mounted above the magazines, and a plurality of pick-up devices carried by said support and each adapted to engage in the top sample in a magazine so as to remove the sample when the support rises and adapted to release the sample so as to deposit the same upon the sheet when the support is lowered, said sample supporting means being located in a plane below said sheet supporting means.

40. A machine for affixing samples to sheets having, in combination, a bed, a plurality of vertically reciprocatory supports on said bed, means for supporting a sample, a horizontally traveling conveyer arranged to support a sheet for movement beneath said reciprocatory supports, means on one support adapted to apply an adhesive substance to the sheet, means on another support for picking up a sample and depositing it upon the sheet, a shaft mounted in said bed below each of said supports and each having a cam thereon, a roller mounted on each of said supports adapted to be operatively engaged by one of said cams, and means for actuating the conveyer and rotating the cams to raise and lower said supports.

41. A machine for affixing samples to sheets having, in combination, means for supporting a sheet, means for supporting a sample, an element having an operating device thereon adapted to be actuated by engagement with the sheet, a roller on said element, and a cam operatively mounted in the machine and adapted to engage with said roller to raise and lower said element to actuate said device.

42. A machine for affixing samples to sheets having, in combination, means for moving a sheet, an element having an operating device thereon movable relative thereto and arranged to operate upon the sheet, a roller on said element, and a cam operatively mounted in the machine and adapted to engage with said roller to raise and lower the element whereby to actuate the operating device thereon.

43. A machine of the character described having, in combination, means for applying an adhesive substance to a sheet, means for placing a sample on the adhesive-treated sheet, and electrical detector means arranged to detect the absence of a sample on the sheet.

44. A machine of the character described having, in combination, means for supporting a sample, means for picking up and applying the sample to a sheet, and means arranged to signal the operator in case of the failure of said sample-applying means to properly place a sample upon the sheet.

45. A machine of the character described, having in combination, means for supporting a sample, means for picking up and applying the sample to a sheet, and means independent of the last mentioned means arranged to signal the operator in case said means fails to properly place a sample upon the sheet.

46. A machine of the character described having, in combination, means for supporting a stack of samples, means adapted to singly and successively remove a sample from the stack and apply it to a sheet, and means arranged to detect the failure of said last mentioned means to perform its function.

47. A machine of the character described having, in combination, adhesive-applying means, sample-applying means, and electrical detector means arranged to stop the machine and signal the operator if a sample is missing from a sheet.

48. A machine of the character described having, in combination, means for affixing a sample to a sheet, and means for detecting the absence of a sample if missing from the sheet.

49. A machine of the character described having, in combination, means for affixing a plurality of samples to a sheet, and means for detecting the absence of any one of said samples if missing from the sheet.

50. A machine of the character described having, in combination, means for applying an adhesive substance to a sheet, means for applying samples to the sheet, means for detecting the absence of a missing sample, and means for causing a relative traveling movement between a sheet on the one hand and the three mentioned means on the other hand.

51. A machine of the character described having, in combination, means for applying a sample to a sheet, and means governed by the presence or absence of a sample on the sheet for controlling the machine.

52. A machine of the character described having, in combination, means for supporting a sample, means for picking up and applying the sample to a sheet, a signal device, and sample-controlled means for operating said signal device to notify the operator in case of a failure in proper functioning.

53. A machine of the character described having, in combination, means for applying samples to a sheet, means to contact the samples on the sheet, detector mechanism, and an electric switch operable by said contacting means to control said mechanism.

54. A machine of the character described having, in combination, means for applying samples to a sheet, means to contact the samples on the sheet, and controlling means set in operation by said contacting means if a sample is missing.

55. A machine of the character described having, in combination, means for applying samples to a sheet, means to contact the samples on the sheet, and signal means set in operation by said contacting means if a sample is missing.

56. A machine of the character described having, in combination, means for applying samples to a sheet, a plurality of devices carrying rollers to run over the samples on said sheet, detector mechanism, and independent electric switches arranged to be operated by said devices to control said mechanism.

57. A machine of the character described having, in combination, means for applying samples to a sheet, a traveling support carrying a sheet and having a plurality of contact plates, a plurality of devices arranged to contact the samples on the sheet, electric switches operable by said devices, and an electric circuit including said switches, said circuit also including pairs of contact devices each arranged to be bridged by one of said contact plates.

58. A machine of the character described having, in combination, a plurality of similar units each comprising adhesive-applying means, sample-applying means, and page-turning means, and means for causing books to travel through the machine and into association with the different means of successive units.

59. A machine of the character described comprising a plurality of similar units, each unit having, in combination, adhesive-applying means, sample-applying means, detector means, and page-turning means, and mechanism for causing the travel of books into association with the successive units.

60. A machine of the character described comprising a plurality of similar units arranged to operate upon successive pages of a book, each unit having means for automatically turning a page of the book to present a new sheet to be operated upon by the succeeding unit.

61. A machine of the character described having, in combination, mechanism for affixing samples to the sheets of a book, and means for automatically turning said sheets.

62. A machine of the character described having, in combination, means for applying an adhesive substance to a sheet of a book, means for applying a sample to the adhesive substance on the sheet, and means for turning the sheet.

63. A machine of the character described having, in combination, means for causing a book to travel, means for applying samples to a sheet of the book, and means for turning over said sheet.

64. A machine of the character described having, in combination, means for causing a book to travel, means for applying samples to a sheet of the book, a device for picking up said sheet, and a stationary device arranged to turn the sheet over in the travel of the book.

65. A machine of the character described having, in combination, means for causing a book to travel, means for operating on a sheet of the book, and means for turning said sheet.

66. A machine of the character described having, in combination, a device arranged to pick up a sheet of a book, a device arranged to fold the sheet over, and means for causing relative traveling movement between the book on the one hand and said two devices on the other hand.

67. The combination of means for operating upon different pages of a book, means for picking up a sheet of a bound book, and means to engage beneath the picked-up sheet and turn it over.

68. The combination of means for operating upon different pages of a book, suction means to pick up a sheet of a bound book, and means to engage beneath the picked-up sheet and turn it over.

69. A machine of the character described having, in combination, means for causing a book to travel, means for applying samples to a sheet of the book, a suction device arranged to pick up said sheet, and a device arranged to engage beneath the picked-up sheet and turn it over as the book travels.

70. A machine of the character described having, in combination, mechanisms for applying samples to different pages of a book, means for causing a book to travel past said mechanisms, and a plurality of devices each adapted to turn over a sheet of the book.

71. A machine of the character described having, in combination, a plurality of mechanisms for operating on the sheets of a book, a plurality of devices each adapted to turn over a sheet of the book, and means for causing books to travel past said mechanisms and said devices, each of said devices comprising suction means to raise a sheet and means to engage beneath the raised sheet and turn it over.

In testimony whereof, I hereunto set my hand in the presence of two witnesses.

WILLIAM P. DUN LANY.

In the presence of—
  STEPHEN G. WOOD,
  GARFIELD P. LENNARTZ.